United States Patent [19]

Pauplis et al.

[11] Patent Number: 5,145,434
[45] Date of Patent: Sep. 8, 1992

[54] VIDEO DISPLAY DEVICE AND METHOD OF MOUNTING A CATHODE RAY TUBE IN A CABINET OF A VIDEO DISPLAY DEVICE

[75] Inventors: William J. Pauplis, Hudson; Victor M. Samarov, Carlisle; George A. Doumani, Andover, all of Mass.

[73] Assignee: Digital Equipment Corporation, Maynard, Mass.

[21] Appl. No.: 721,264

[22] Filed: Jun. 26, 1991

[51] Int. Cl.⁵ .............................................. H04N 5/645
[52] U.S. Cl. ...................................... 445/23; 358/248; 358/254
[58] Field of Search .................... 445/23, 22; 358/248, 358/254, 255

[56] References Cited

U.S. PATENT DOCUMENTS

| | | |
|---|---|---|
| 2,750,587 | 6/1956 | Nicholson et al. |
| 3,136,850 | 6/1964 | Blaker ........................... 358/254 |
| 3,271,516 | 9/1966 | Damm ........................ 220/2.1 A |
| 3,716,662 | 2/1973 | Johnson . |
| 4,064,542 | 12/1977 | Enkhaus ..................... 358/248 X |
| 4,560,900 | 12/1985 | Ikegaki et al. ................... 313/479 |
| 4,593,227 | 6/1986 | Bruce et al. ..................... 313/482 |
| 4,731,557 | 3/1988 | Asano et al. .................... 313/482 |
| 4,820,224 | 4/1989 | Lemche ............................ 445/23 |

*Primary Examiner*—Kenneth J. Ramsey
*Attorney, Agent, or Firm*—Arnold, White & Durkee

[57] ABSTRACT

A cathode ray tube mounting apparatus and method for use in a video display terminal or television receiver. An adhesive is applied to either the inside perimeter of the bezel of the cabinet or to the perimeter of the front surface of the cathode ray tube. The cathode ray tube and bezel are then placed in contact and pressed together. Before the adhesive has set, the position of the cathode ray tube is adjusted to align the cathode ray tube with the horizontal center line of the cabinet. In another embodiment, a sheet of material is attached to the inside of the front portion of the cabinet. The adhesive is applied to either the sheet of material or to the front surface of the cathode ray tube. The cathode ray tube and front portion of the cabinet are then mated as before. The sheet of material is used to compensate for any thermoexpansion mismatch between the cathode ray tube and the cabinet.

6 Claims, 2 Drawing Sheets

VIDEO DISPLAY DEVICE AND METHOD OF MOUNTING A CATHODE RAY TUBE IN A CABINET OF A VIDEO DISPLAY DEVICE

FIELD OF THE INVENTION

The present invention relates to a cathode ray tube mounted in a cabinet of a video display device and to a method for securing the cathode ray tube to the bezel of a video display enclosure without fasteners and using only an adhesive. An intermediate sheet of material can be incorporated into the bezel of the video display device enclosure to compensate for excessive stress in the adhesive layer between the cathode ray tube and the bezel due to a thermoexpansion mismatch between the materials.

BACKGROUND OF THE INVENTION

Prior art methods and apparatus are well known for positioning a cathode ray tube (CRT) or a picture tube or a kinescope in a cabinet of a video display device for securing the CRT in a viewable position to the cabinet. In the past, the problems of accurately positioning and then securing a CRT to a cabinet were mainly associated with television receivers manufactured by the television industry. More recently, these problems have also been associated with video display terminals manufactured by the computer industry.

In both the television industry and the computer industry the essential problem of accurately positioning and then securing the CRT within the cabinet remains the same. Specifically, the CRT must first be accurately positioned within the cabinet so that the face of the CRT is flush with the bezel of the cabinet and the appropriate portion of the face of the CRT is aligned with the opening in the cabinet. Next the CRT must be permanently secured to the bezel without causing a misalignment with the face of the CRT. The connection between the CRT and the bezel must also be strong enough to withstand possible shock and vibration load as well as temperatures existing during shipping of the product and also during normal operation.

A variety of prior art mounting systems exist which have attempted to solve these problems. One common method is to attach mounting ears at each corner of the front portion of the CRT with a metal strap. The metal strap is wrapped around the mounting ears and the CRT and is then tightened and clamped. The CRT is subsequently mounted to the inner front portion of the cabinet which contains mounting holes for accepting screws. The screws are driven through holes in the mounting ears while the CRT is properly aligned with the cabinet. Once the CRT is aligned, the screws are finally tightened to provide a secure attachment of the CRT to the cabinet. A spring mounted strap is then attached to diagonally positioned ears and contacts the aquadag of the CRT to provide electrical grounding.

The above described mounting ear and screw type of system, however, has several drawbacks. This system is labor intensive due to the attachment of the ears to the CRT through the tightening and clamping of the strap to the CRT and due to the tightening down of the screws while adjusting the position of the CRT in the cabinet. In addition, this type of system requires the use of multiple fasteners which increases the cost and the complexity of the system.

In addition, securing the CRT within the cabinet in the properly aligned position is also difficult in the mounting ear and screw type of system. The tightening of the screws through the mounting ears to the cabinet, by its very nature, distorts the entire mounting apparatus during the final tightening of the screws. This tightening introduces unwanted forces to the mounting apparatus and can displace the properly aligned CRT before the CRT is finally screwed into place. When this occurs, the CRT must be loosened, repositioned, and tightened again to obtain a proper alignment.

Other hardware oriented mounting systems include the use of a rear support member which pushes the CRT into the cabinet from behind. The rear support member fits around the rear funnel portion of the CRT and includes mounting ears or other means which are then coupled to the inside front of the cabinet as previously described. In addition to the problems of multiple fasteners and of aligning the CRT to the cabinet, this type of system includes the problem of interfacing the rear support member to the rear funnel surface of the CRT, a surface which is not consistently formed to a predictable shape.

Non-hardware oriented types of mounting systems which use a bonding material to hold the CRT within the enclosure are also known. One such system mounts a CRT within a case which is shaped to essentially follow the line of the rear funnel portion of the CRT. The CRT is placed into the case, funnel end first. A space is thereby created between the funnel portion of the CRT and the case. An elastic material typically comprising silicone rubber is poured in the space between the funnel of the CRT and the inside wall of the case to hold the CRT therein. A cavity is formed between the case and the silicone rubber to provide for thermal expansion of the elastic material.

The cavity between the case and the silicone rubber restricts the axial forward shifting of CRTs mounted in these types of cases. As this system relies on mounting the rear funnel surface of the CRT to the case, it suffers from the previously mentioned problem of relying on the inaccurately formed rear funnel for mounting purposes.

Another system using a non-hardware mounting means is used in small CRTs having image areas of six inches or less and in which the anode connection is close to the front surface of the CRT. In this is system, the sides of the tube are perpendicular to the front surface of the CRT. A mounting means including a collar surrounds the sides of the CRT. A channel formed between the collar and the sides of the tube is filled with a bonding material which when hardened retains the mounting means around the CRT. The mounting means includes holes to facilitate attachment of the mounting means to a suitable support medium, such as a cabinet.

This side-mounted type of system is not suitable for larger CRT's used in video display terminals and televisions. Larger CRT's typically have tolerances of plus or minus 0.125 inch on their glass across the face dimensions. The size of this dimension makes it difficult to bond the CRT at its sides to the mounting means. Currently available structural adhesives will not cure consistently or reliably across a gap of 0.125 inches or more to form the required bond between the sides of the CRT and the collar.

SUMMARY OF THE INVENTION

The present invention provides an apparatus and method for mounting a cathode ray tube in the bezel of a video display enclosure of a video display device such as a video display terminal or a television receiver. The CRT is mounted at the screen delimiting opening of the bezel by a layer of structural adhesive. The adhesive is applied to either the inner CRT facing surface of the bezel, which is typically made of plastic and shaped at its inner surface to conform with the front surface of the CRT, or to the front surface of the CRT. While the adhesive is still uncured and flexible, the CRT is powered up and fed a video signal. The video signal contains aligning features which enable the CRT to be mechanically and/or automatically aligned with the bezel opening by positioning the CRT relative to the bezel. The adhesive is then cured to form a structural bond between the CRT and bezel.

In an alternative embodiment of the present invention, means are provided to compensate for excessive stresses which develop in the adhesive layer due to changes in ambient temperature and in a thermoexpansion coefficient (TEC) mismatch between the materials of the CRT and the bezel. The compensating means is a sheet of material secured to the inner surface of the plastic bezel. The sheet of material has a coefficient of thermal expansion approximating the coefficient of thermal expansion of the CRT and is shaped to conform to the front surface of the CRT. The adhesive is applied between the sheet of material and the front surface of the CRT and a structural bond at the face of the CRT takes place. The sheet of material is selected from a group of materials having a TEC much lower than that of plastic and closer to the TEC of the glass of the CRT, for instance cold rolled steel.

The sheet of material interfacing the CRT to the bezel also includes a plurality of integral spring-like contacts or fingers for electrically engaging the aquadag of the CRT to provide electrical continuity for EMI/RFI shielding and grounding purposes.

The present invention provides a CRT mounting apparatus and method which reduces assembly cost and simplifies the mounting process when compared to prior art systems. No mechanical fasteners are needed to attach the CRT to the enclosure. In addition, the method of aligning the raster to the bezel and enclosure is significantly improved because the position of the CRT can be adjusted in an infinite number of directions. The use of adhesive also eliminates the need for repositioning found in the prior art which resulted from the misalignment caused by the tightening of the screws.

The present invention uses an adhesive applied to the front surface of the CRT or to the inner surface of the bezel or sheet of material. Since the front surface of the CRT is well defined and polished, this surface provides a uniform mounting surface as opposed to either the funnel surface or the sides of the CRT which typically do not meet strict size tolerances. Consequently, the present invention not only increases the predictability of the manufacturing process but also makes it possible to maintain a consistent standard of quality from video display terminal to video display terminal The means for grounding to the aquadag does not rely on the spring mounted strap of the prior art. In this fashion, the number of hardware components are further reduced and consequently steps of labor are also reduced.

DESCRIPTION OF THE PREFERRED EMBODIMENTS

Figure 1:
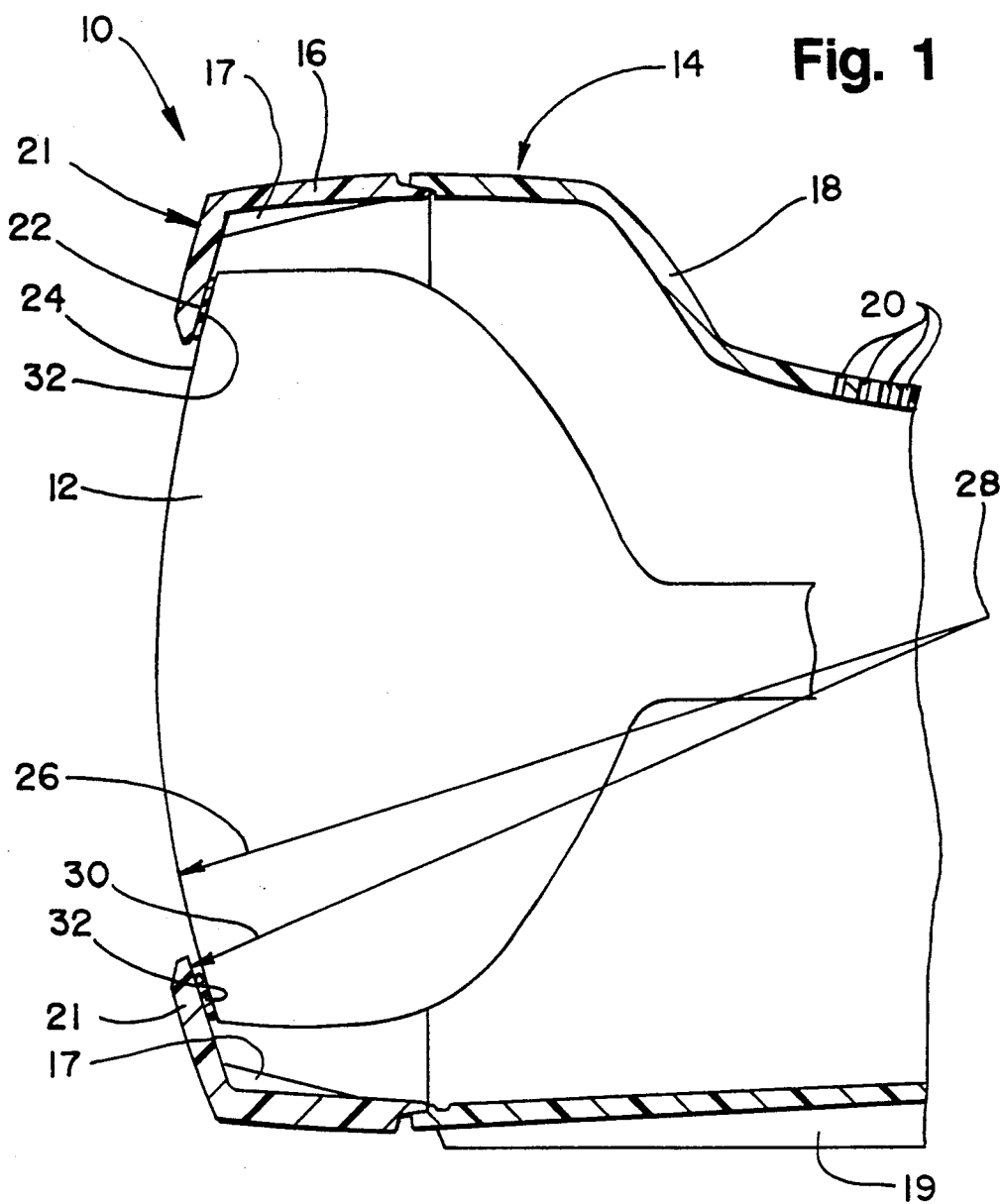
FIG. 1 illustrates one embodiment of the present invention for mounting a cathode ray tube in a video display terminal.

Referring now to FIG. 1, one embodiment of the present invention is shown. A video display terminal 10 is illustrated which includes a cathode ray tube (CRT) 12 mounted within a video display terminal enclosure or cabinet 14. The cabinet 14 includes a bezel portion 16 having structural support members 17 and a rear enclosure portion 18 having a supporting member 19 and vent holes 20. The bezel portion 16 of the cabinet 14 includes a front portion 21 having an inner bezel surface 22 which faces a front surface 24 of the CRT 12. The bezel portion 16 is typically made of a structural plastic, such as Noryl by General Electric. It is preferred that the bezel profile is a shallow one which follows the profile of the front surface 24 of the CRT 12.

The front surface 24 of the CRT 12 is a ground and polished spherical surface formed during the manufacturing process. As a result of the grinding and polishing, the front surface 24 has a well defined and consistent radius 26 taken from a point 28 which is located behind the front surface 24 as one skilled in the art would understand.

In the present invention, the inner bezel surface 22 of the bezel portion 16 has a radius 30 being substantially the same as radius 26 of the front surface 24. If a cathode ray tube with other than a spherical surface is used, however, the inner bezel surface 22 is still shaped to conform to the front surface 24 of the CRT. Consequently, the inner bezel surface 22 and the front surface 24 combine to create an interface.

Figure 2:
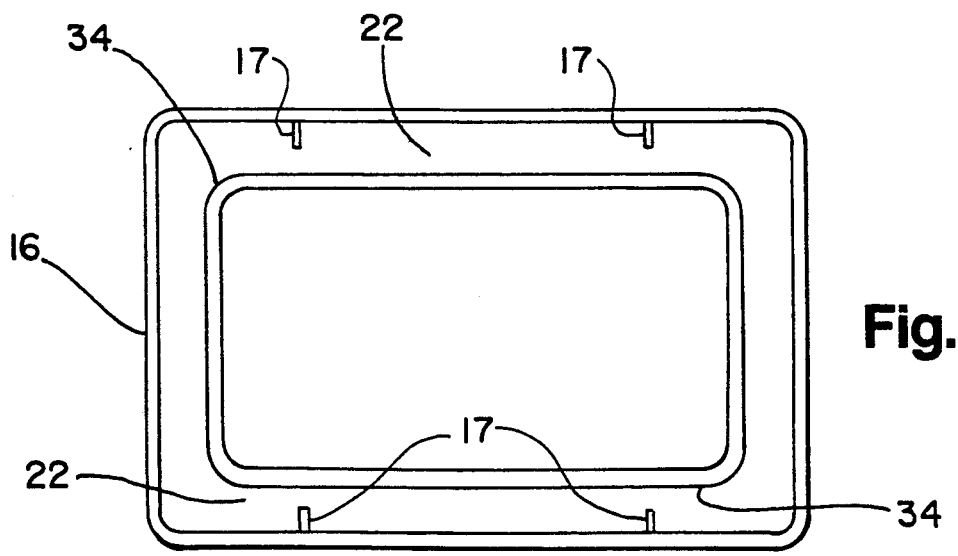
FIG. 2 illustrates the front portion of a video display terminal to which the cathode ray tube is mounted.

The CRT 12 is assembled to the bezel portion 16 of the cabinet 14, as seen in FIG. 2, while the bezel portion 16 is placed face down thereby providing access to the inner bezel surface 22 of the front portion 21. An adhesive 32 (see FIG. 1) is applied along a line 34 (see FIG. 2) to the inner bezel surface 22 around the perimeter of the screen-delimiting opening of the bezel portion 16. Alternatively, the adhesive 34 could be similarly applied to a corresponding line on the front surface of the CRT 12. The thickness of the adhesive, as applied, will vary according to the size and weight of the CRT and to the strength of the adhesive. The layer of adhesive applied along the line 32 also does not need to be continuous, but should be applied in sufficient area to make a strong bond with the CRT 12 once cured.

The preferred adhesives are silicone adhesives and can be obtained from a number of manufacturers. The following silicone adhesives work well in the present invention: RTV Q3-6093 by Dow Corning, Experimental Silicone #2747-1 by General Electric and Ultraglaze SSG 4000 Black also by General Electric.

While the adhesive 32 is still uncured and flexible, the CRT 12 is electrically powered up to provide a raster, which preferably includes a location pattern as is well known in the art. The CRT 12 is then placed into the bezel portion 16 of the cabinet 14. The CRT 12 is lowered into the bezel portion 16 until the front surface 24 of the CRT 12 comes in contact with the adhesive 32 placed along the line 34. While the adhesive is still uncured, the CRT 12 is either manually or automatically aligned to the screen delimiting opening of the bezel portion 16 by positioning the CRT relative to the bezel portion 16 until the location pattern is properly aligned. An appropriate amount of pressure is applied to the CRT 12 so that any voids present in the adhesive layer between the front surface 24 of the CRT 12 and the inner bezel surface 22 are eliminated. The amount of pressure applied will depend on the viscosity of the adhesive and the weight of the CRT. In some instances, the weight of the CRT will be sufficient to redistribute the adhesive so that any voids are eliminated. In other instances, however, where the weight of the CRT is insufficient to properly distribute the adhesive, additional pressure must be applied. If additional pressure is applied, it should be done during the alignment of the CRT to avoid any deviation from the aligned position.

Once the CRT is aligned, the adhesive is cured. Curing is performed by either applying heat or by applying a catalyst to the adhesive. In the case of a heat-cured adhesive, the bezel/CRT assembly is placed in a thermochamber or a thermofurnace for a period of time sufficient to cure the adhesive. The amount of heat that is applied for curing the adhesive 32 and the manner of application is within the knowledge of someone ordinarily skilled in the art. For example the bezel/CRT assembly can be placed on a conveyor running through the thermofurnace with a warm-up, soak, and cool-down cycle.

In the case of a catalyst-cured adhesive, a catalyst gas is released in a catalyst chamber containing the bezel/CRT assembly. The bezel/CRT assembly remains in the catalyst chamber a sufficient time until the adhesive is cured as is well known in the art.

In the preferred embodiment, the thickness of the adhesive once set is approximately five to ten mils. However, this thickness can change depending upon the type of adhesive and the size of the CRT. Accordingly, the thickness of the adhesive 32 is variable as is well known in the art.

One method of automatic alignment is to use a robot equipped with machine vision to monitor the location pattern and to adjust the position of the CRT 12 with respect to the bezel portion 16 as would be understood by those skilled in the art.

For video display terminals, the CRT 12 is aligned within one thirty-second of an inch of horizontal. This tolerance is tighter than that of television receivers whose tolerance is typically between one-eighth and one-sixteenth of an inch. The method of aligning the CRT 12 while the adhesive is still uncured makes it possible to meet any reasonable tolerance specifications. In addition, this procedure avoids the realignment frequently required in the prior art resulting from the misalignment caused by tightening the screws.

Figure 3:
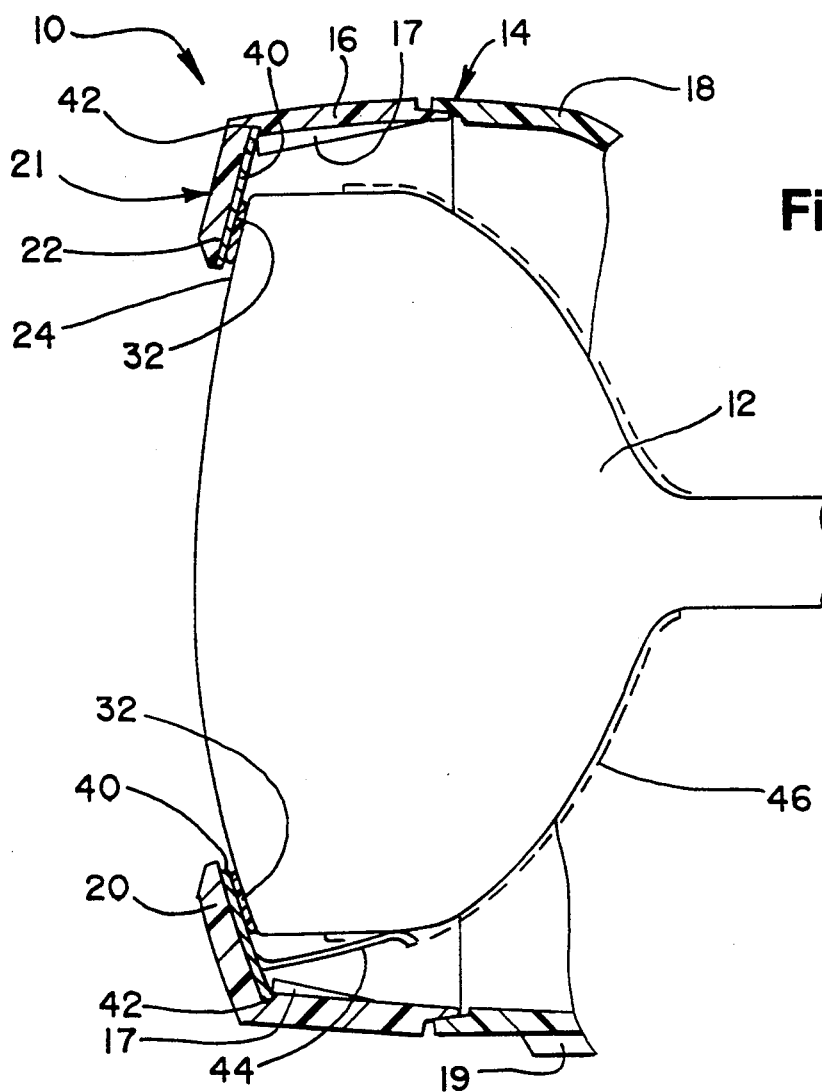
FIG. 3 illustrates the preferred embodiment of the present invention including a sheet of material interposed between the cathode ray tube and the bezel.
Figure 4:
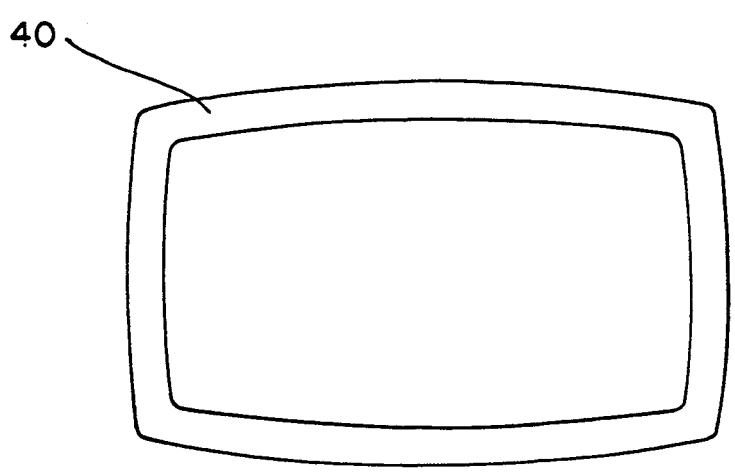
FIG. 4 illustrates a plan view of the sheet of material interposed between the cathode ray tube and the bezel.
Figure 5:
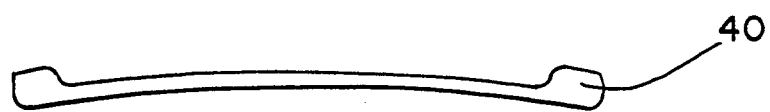
FIG. 5 illustrates a side view of the sheet of material interposed between the cathode ray tube and the bezel.

FIG. 3 illustrates a video display terminal incorporating another embodiment of the present invention. In addition to the previously described elements, this embodiment incorporates a sheet of material 40 embedded into the bezel portion 16. The sheet of material 40 follows the shape and contour of the bezel surface 22 of the bezel portion 16 of the cabinet 14 as seen in FIG. 4. A side view of the sheet of material 40 is illustrated in FIG. 5. FIG. 5 additionally illustrates the curvature of the sheet of material 40 which essentially conforms to the shape of the front surface 24 of the CRT 12.

The use of the sheet of material 40 between the inner bezel surface 22 and the front surface 24 of the CRT 12 compensates for excessive stresses generated in the adhesive 32 which normally appear between the inner bezel surface 22 and the front surface 24 of the CRT 12 when these two surfaces are adhered directly to one another. The excessive stresses are generated in the adhesive layer at the extremes of ambient temperatures due to a thermoexpansion differential between the materials of the bezel portion 16 and the glass of the CRT 12. The sheet of material 40 is selected from a group of materials having a thermoexpansion coefficient (TEC) much lower than that of plastic and closer to or approximately the TEC of the glass of the CRT. One such material is 1020 cold-rolled steel.

Returning to FIG. 3, the sheet of material 40 fits between the inner bezel surface 22 and the front surface 24 of the CRT 12. The sheet of material 40 is formed as a structural part of the bezel portion 16 by insert molding the sheet of material into the bezel portion 16 at an inner perimeter surface 42 around the perimeter of the screen-delimiting opening. As previously shown, in FIGS. 4 and 5, the sheet of material 40 is shaped to conform to the front surface 24 of the CRT 12. The sheet of material 40 thus forms a surface on which the adhesive 32 is applied as previously described.

In the preferred embodiment, the sheet of material has a thickness which is approximately 0.048 inches thick. The thickness of the sheet of material 40 can vary as long as it provides sufficient strength for supporting the CRT 12.

The sheet of material 40 is either incorporated into the bezel portion 16 of the cabinet 14 during molding of the bezel or the bezel portion 16 is molded to include snap fit mounting features for snap fit mounting the sheet of material 40 into the bezel portion 16. If the sheet of material 40 is snap fit into snap fit mountings on the plastic bezel portion 16, a tight fit between the bezel and sheet of material 40 is made in all X, Y, and Z directions. The adhesive is then dispensed either to the face of the CRT 12 or to the sheet of material 40 as previously described. Once aligned, temperature and/or pressure as discussed above is optionally applied to the bezel/CRT assembly to complete assembly. While molding or snap fitting the sheet of material 40 into the bezel portion 16 has been discussed, other means of attachment are within the scope of the invention.

In FIG. 3, the sheet of material 40 also includes at least one finger 44 attached thereto should EMI/RFI shielding and static control be desired. The finger 44 projects inwardly into the cabinet 14 and is made of a resilient material. The finger 44 is either an integral part of the sheet of material 40 or is a separate piece of material which can be attached to the sheet of material 40 by methods known to those skilled in the art.

The length of the finger 44 varies depending on the size of the cabinet and the size of CRT. The finger 44 is of sufficient length so that the finger 44 contacts the aquadag 46 of the CRT 12, shown in FIG. 3 as a dotted line. By electrically grounding the finger 44, the aquadag 46 is also grounded to provide EMI/RFI shielding and static control for the CRT 12. The width of the finger is selected to provide sufficient stiffness so that the finger makes a good electrical contact with the aquadag 46 as is known to those skilled in the art.

A plurality of fingers are incorporated into the sheet of material 40. For instance, one finger is positioned at each corner of the CRT 12 to provide additional insurance that good electrical contact is made between electrical ground and the aquadag 46. The number of fingers 44 chosen and incorporated into the sheet of material 40 is within the ability of one ordinarily skilled in the art.

The foregoing description of the invention has been presented for purposes of illustration and description. It is not intended to limit the invention to the precise forms disclosed, and many modifications and variations are possible in light of the above teachings.

What is claimed is:

1. A video display device comprising:
    a cabinet having a bezel portion and a rear enclosure portion, said bezel portion having an inside surface and a screen delimiting opening;
    a cathode ray tube having a front surface portion; and with said inside surface of said bezel portion and said front surface portion of said cathode ray tube for coupling said cabinet to said cathode ray tube.

2. A video display device comprising:
    a cabinet having a bezel portion and a rear enclosure portion, said bezel portion having an inside surface and a screen delimiting opening;
    a cathode ray tube having a front surface portion;
    a sheet of material coupled to said bezel portion of said cabinet and having a screen delimiting opening;
    an adhesive means placed between and in contact with said sheet of material and said front surface portion of said cathode ray tube for coupling said cabinet to said cathode ray tube.

3. The video display device of claim 2 wherein said sheet of material has a thermal expansion coefficient approximating the thermal expansion coefficient of said cathode ray tube.

4. The video display device of claim 2 wherein said sheet of material has at least one finger for grounding the aquadag of said CRT.

5. In a video display device having a cathode ray tube and an enclosure for supporting the cathode ray tube in a viewable position, the enclosure having a screen delimiting opening and a bezel portion with an inside surface shaped to conform to the front surface of the cathode ray tube, a method for mounting the cathode ray tube in the enclosure using an adhesive, said method comprising the steps of:
    placing the adhesive between and in contact with the inside surface of the bezel portion and the front surface portion of the cathode ray tube;
    adjusting the position of the cathode ray tube to align the cathode ray tube with the screen delimiting opening of the bezel portion; and
    curing the adhesive to form a bond between the inside surface of the bezel portion and the front surface of the cathode ray tube and to secure the cathode ray tube in alignment with the screen delimiting opening of the bezel portion.

6. In a video display device having a cathode ray tube, an enclosure for supporting the cathode ray tube in a viewable position, said enclosure having a bezel portion and a screen delimiting opening, a sheet of material connected to said bezel portion of said enclosure and conforming to the front surface of the cathode ray tube, a method for mounting said cathode ray tube in said enclosure using an adhesive, said method comprising the steps of:
    mounting the sheet of material to the bezel portion of the enclosure;
    placing the adhesive between and in contact with the surface of the sheet of material opposite the surface facing the bezel portion and the front surface portion of the cathode ray tube;
    adjusting the position of the cathode ray tube to align the cathode ray tube with the screen delimiting opening of the enclosure; and
    curing the adhesive to form a bond between the inside surface of the bezel portion and the front surface of the cathode ray tube and to secure the cathode ray tube in alignment with the screen delimiting opening of the bezel portion.

* * * * *